United States Patent
Teubert et al.

(10) Patent No.: US 7,204,775 B2
(45) Date of Patent: Apr. 17, 2007

(54) PLATE-LINK CHAIN FOR A CONTINUOUSLY VARIABLE TRANSMISSION

(75) Inventors: André Teubert, Bühl (DE); André Linnenbrügger, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 175 days.

(21) Appl. No.: 10/778,932

(22) Filed: Feb. 13, 2004

(65) Prior Publication Data

US 2005/0282674 A1 Dec. 22, 2005

(30) Foreign Application Priority Data

Feb. 20, 2003 (DE) ............... 103 07 035

(51) Int. Cl.
*F16G 13/02* (2006.01)
(52) U.S. Cl. ....................... 474/215; 474/206
(58) Field of Classification Search ........... 474/202, 474/206, 212, 213, 214, 215; 59/1
See application file for complete search history.

(56) References Cited

U.S. PATENT DOCUMENTS

| | | | | |
|---|---|---|---|---|
| 5,427,583 A | * | 6/1995 | Wolf | 474/206 |
| 6,135,908 A | * | 10/2000 | Greiter | 474/215 |
| 6,186,920 B1 | * | 2/2001 | Reber | 474/212 |
| 6,244,983 B1 | * | 6/2001 | Matsuda | 474/155 |
| 6,478,704 B1 | * | 11/2002 | Greiter | 474/229 |

* cited by examiner

*Primary Examiner*—Vicky A. Johnson

(74) *Attorney, Agent, or Firm*—Alfred J. Mangels

(57) ABSTRACT

A plate-link chain formed from short plate links and long plate links. The long plate links have an extension at one end. The installation direction of the long plate links is such that their extensions overlap plate links in an adjacent row and that are next in order in the longitudinal direction of the plate-link chain, when viewed from the side of the chain. The overlap permits the plate links to have defined positions relative to adjacent plate links by minimizing the ability of adjacent plate links to shift laterally relative to each other.

13 Claims, 2 Drawing Sheets

PLATE-LINK CHAIN FOR A CONTINUOUSLY VARIABLE TRANSMISSION

BACKGROUND OF THE INVENTION

1. Field of the Invention

The invention relates to plate links for a plurality of different plate-link chains for belt-driven, conical pulley transmissions. The invention further relates to a plate-link chain that is composed of such links.

2. Description of the Related Art

FIG. 1 shows, in a top view, a section of a known plate-link chain as it is utilized as an endless torque-transmitting means for belt-driven, conical pulley transmissions. Such belt-driven, conical pulley transmissions have two pairs of conical disks around which the plate-link chain circulates. The distances between the conical disks of the pairs of conical disks are adjusted in opposite directions in order to continuously adjust the transmission ratio of such a belt-driven, conical pulley transmission.

One such plate-link chain is composed of individual plate links 10 that are arranged in several rows I, II, III, and so on, that extend next to one another in the longitudinal direction of the plate-link chain. At least some of the plate links of adjacent rows are offset relative to each another, so that pins 12 that extend transversely through the plate-link chain, establish a longitudinal and transverse connection of the plate-link chain.

FIG. 2 shows a side view of a plate link 10. As can be seen, each of the pins is formed from a pair of rocker members 14 and 16, collectively designated by 12, wherein the side surfaces of the rocker members 14 that face away from one another are in contact with inner surfaces of a plate link opening 18, and the surfaces of each pair of rocker members 14, 16 that face one another form rolling surfaces on which the rocker members 14 and 16 roll against each other during curving of the plate-link chain.

The end surfaces of the rocker members that extend laterally from the plate-link chain form bearing surfaces that come into frictional contact with the conical surfaces of the conical disks of the belt-driven, conical pulley transmission.

One structural object in the design of such plate-link chains is to make the spacing T of the plate-link chain, that is, the distance between two adjacent pins 12 or rocker member pairs 14, 16 as small as possible. The longitudinal width D of the perpendicular web of the ends of plate link 10, required for reasons of strength, is controlling with regard to that distance. A small spacing between adjacent pins 12, in which as many end surfaces as possible of the pins or rocker member pairs are simultaneously in frictional contact with the conical surfaces of the conical disks, produces increased torque transmitting capacity, and equalizes the stress on the individual components.

FIG. 1 shows a plate-link chain in the so-called double plate link connection in which the arrangement of the plate links repeats after each two spacings, or in the lateral direction of the chain preferably every two rows. As can be seen, the spacing is determined by twice the thickness of the rocker members (or the diameter of a pin) and twice the longitudinal width D of the plate link ends plus a slight distance between successive plate links.

A distinctly smaller spacing is achieved with the so-called triple plate link connections in accordance with FIG. 3, in which the pattern repeats each three spacings, or preferably every three rows in the transverse direction of the plate-link chain. As can be seen, the spacing in the case of the triple plate link connection is twice the thickness of the rocker members or the diameter of a pin, plus the longitudinal width D of a plate link end plus a slight distance between the plate link and the pin or rocker member. Thus, the triple plate link connection in accordance with FIG. 3 permits a smaller spacing T than the double plate link connection in accordance with FIG. 1.

Relative to FIG. 2, it can be pointed out that the line 20 there shows the right-hand edge of the region of the adjacent plate link $10_1$ of the arrangement in accordance with FIG. 3, which is visible through the plate link opening 18.

Based upon acoustic excitation and noise comfort, it is advantageous if the plate-link chain has different spacings between adjacent pins 12 or rocker member pairs. In that way individual sound impulses can be reduced or suppressed.

FIG. 4 shows a section of such a plate-link chain with a short spacing TK next to a long spacing $T_L$. That is possible by utilizing two different kinds of plate links, a short plate link $10_K$ and a long plate link $10_L$, that differ essentially only as a result of the length of the plate link opening 18 (FIG. 2) measured in the longitudinal direction of the plate-link chain.

A problem that arises in the case of the construction of the plate-link chain in accordance with FIG. 4, which is arranged using the same triple plate link connection as the chain in accordance with FIG. 3, resides in that the plate link $10_x$, which can be a short or a long plate link and which follows the uppermost plate link $10_K$ toward the right in accordance with FIG. 4, no longer overlaps the plate link $10_{K1}$ that follows the plate link $10_K$ in the adjacent row toward the right, so that the plate link $10_x$ can be displaced laterally to the longitudinal direction of the plate-link chain along the pin or the rocker member pair.

The object of the invention is to provide a possibility for manufacturing plate-link chains with different spacings with the fewest possible different links, without the occurrence of the problem that was indicated by means of FIG. 4, that plate links have undefined positions in the transverse direction of the plate-link chain.

SUMMARY OF THE INVENTION

That object is achieved by means of plate links for a plurality of different plate-link chains for belt-driven, conical pulley transmissions, which plate-link chains have plate links arranged one behind the other in several rows arranged next to one another transversely to the longitudinal direction of the plate-link chain. The plate links overlap transversely relative to the running direction and are connected by pins that penetrate them transversely to the longitudinal direction. Each plate link is penetrated by two pins, one of which is supported on a forward inner side of a plate link opening in the longitudinal direction of the plate-link chain, and the other is supported on a rear inner side of a plate link opening, in the running direction of the plate-link chain. The plate links are drawn from one of various plate links that are composed of two kinds. The plate links of the one kind are longer in the longitudinal direction of the plate-link chain than those of the other kind, and the distance between the forward and the rear inner sides of the plate link opening of the long plate links is greater than that of the short plate links. The longer plate links have an extension in the longitudinal direction at one of their longitudinal ends and the extension overlaps a short plate link that is connected to the long plate link in the longitudinal direction of a plate-link chain by the intermediate arrangement of a further long link.

A plate-link chain in accordance with the invention is constructed of short and long plate links of the above-mentioned variety that includes only two different kinds of plate links.

The long plate links advantageously follow one another in pairs in the longitudinal direction of the chain.

Further preferred is a formation of the plate-link chain in accordance with the invention in such a way that the long plate links that follow one another in the longitudinal direction of the plate-link chain are arranged oppositely relative to the longitudinal direction of the plate-link chain.

It is advantageous for an extension of one long plate link of a pair of plate links in each case to face an extension of the other plate link of the pair of links.

The plate-link chain in accordance with the invention can be constructed in such a way that, in the longitudinal direction of the plate-link chain, different numbers of short plate links and different numbers of pairs of plate links with long plate links follow one another.

The plate-link chain in accordance with the invention is preferably constructed in such a way that the plate links are arranged in a triple plate link connection.

BRIEF DESCRIPTION OF THE DRAWINGS

The invention will be explained below on the basis of exemplary schematic drawings and with further details.

There is shown.

DESCRIPTION OF THE PREFERRED EMBODIMENTS

Figure 1:
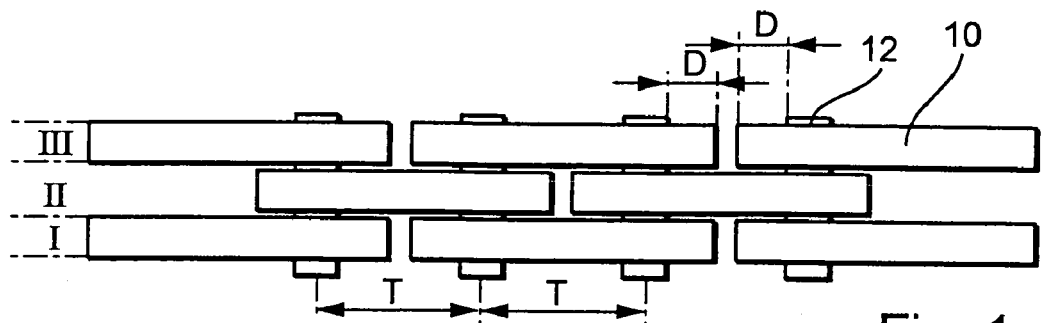
FIG. 1 a top view of a known plate-link chain.
Figure 3:
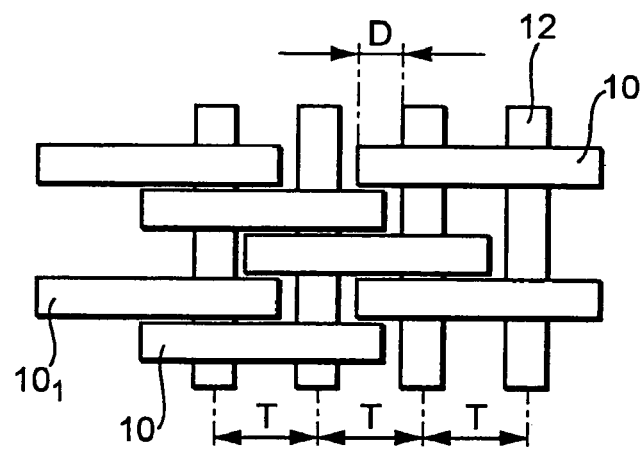
FIG. 3 a top view of a known plate-link chain in the triple plate link connection.
Figure 4:
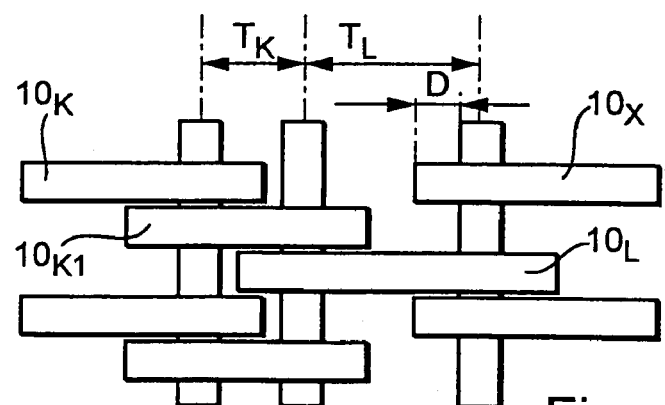
FIG. 4 shows a top view of the plate-link chain in accordance with FIG. 3 with plate links of different lengths, FIG. 5 a top view of a plate-link chain in accordance with the invention, FIG. 6 side views of plate links that have been assembled in the plate-link chain in accordance with FIG. 5, FIG. 7 a side view of a section of a plate-link chain, and FIG. 8 a side view of a section of a modified embodiment of a plate-link chain.
Figure 5:
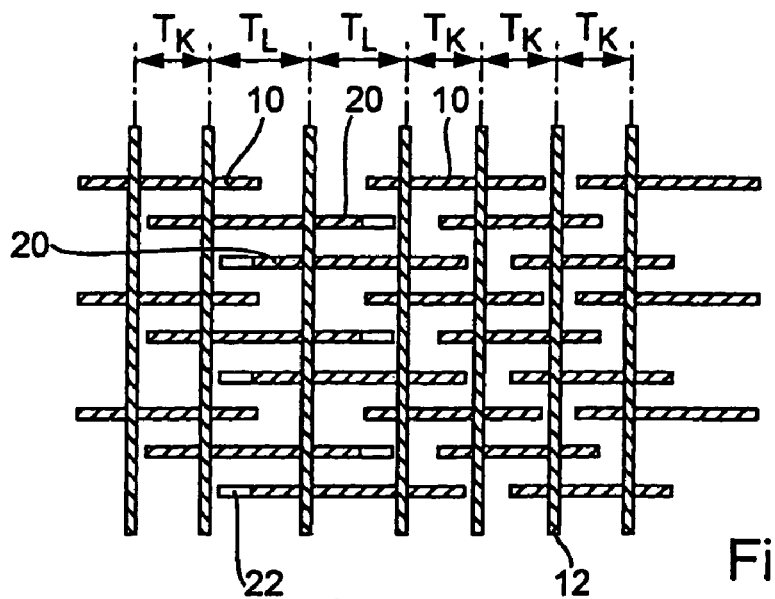
Figure 6:
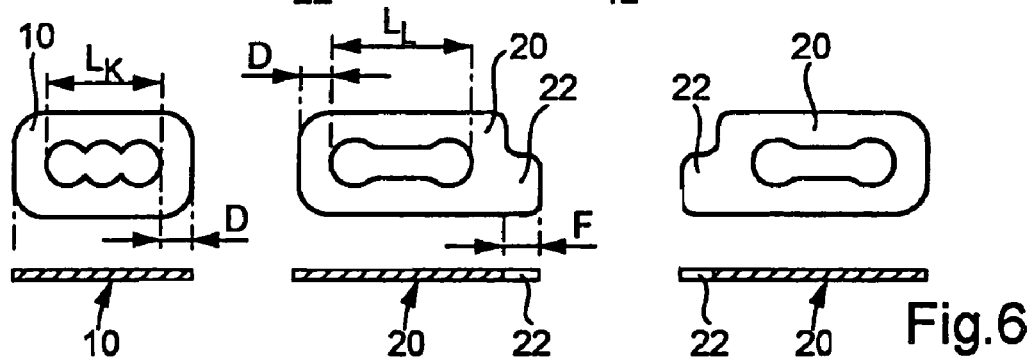

FIG. 6 shows side views of plate links in the form in which they are utilized in accordance with the invention for the assembly of plate-link chains. FIG. 5 shows a top view of a plate-link chain that is composed of such links, wherein for improved clarity the top view in accordance with FIG. 5 has been illustrated in a simplified form relative to that of FIGS. 1, 3, and 4, and is lined as a grid.

Figure 2:
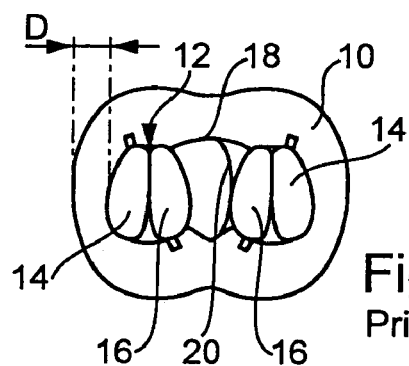
FIG. 2 a side view of a plate link.

In accordance with FIG. 6, a first kind of plate link is formed from short plate links 10 that are constructed in a manner similar to the plate link in accordance with FIG. 2. The longitudinal width of the perpendicular side of the plate link 10 again amounts to D, and the plate link opening 18 has a predetermined length $L_K$ as measured in the longitudinal direction of the plate link. In addition to the short plate links 10, there are long plate links 20 that differ from the short plate links 10 by their longer opening length $L_L$, and in addition that one end is formed with an extension 22 of the length F. The plate link 20 can be oriented in the plate-link chain in both directions, that is, with the extension 22 directed toward the right or with the extension 22 directed toward the left, as shown in FIG. 6. The lower, solid and partially not completed lines of FIG. 6 each indicate top views of the links, wherein the non-filled region of the thick lines represents the extension 22.

FIG. 5 shows a plate-link chain that is composed of short plate links 10 and long plate links 20, whereby in the illustrated example two long spacings $T_L$, or distances between the pins or pairs of rocker members, are arranged between short spacings $T_K$.

As can be seen directly from FIG. 5, an overlapping with adjacent short plate links 10 is achieved by the extensions 22 of the long plate links 20, wherein in each case two long plate links 20 follow one another in the longitudinal direction of the plate-link chain and form adjacent pairs. As can further be seen from FIG. 5, the long plate links 20 of a pair of long plate links adjacent to each other are, in each case, arranged in opposite directions, so that the extensions 22 each point in the direction in which a long plate link 20 follows in the adjacent row.

With both kinds of plate links in accordance with the invention and in accordance with FIG. 6, the most widely differing plate-link chains can be built up, for example plate-link chains that are built up only of short plate links 10 or only of long plate links 20, or plate-link chains built up with both kinds of plate links.

As shown in FIG. 5, the long plate links are each arranged in pairs in the case of the triple plate link connection, wherein several pairs can follow one another directly, so that plate-link chains with the most different spacing patterns can be manufactured that exhibit excellent acoustic characteristics using longitudinal pin spacings that are all small, though different.

Figure 7:
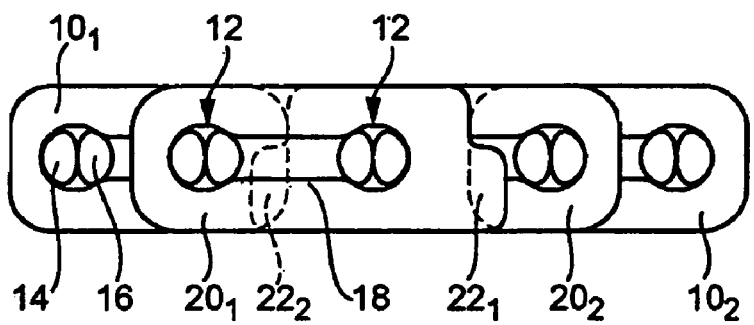

FIG. 7 shows a side view of a section of a plate-link chain in which, seen from the left, a long plate link $20_1$, with an extension $22_1$ on the right side follows an adjacent short plate link $10_1$, which is in turn followed by an adjacent long plate link $20_2$ with an extension $22_2$ arranged on the left side, followed by a short plate link $10_2$.

Thus two long spacings are found between short spacings.

Figure 8:
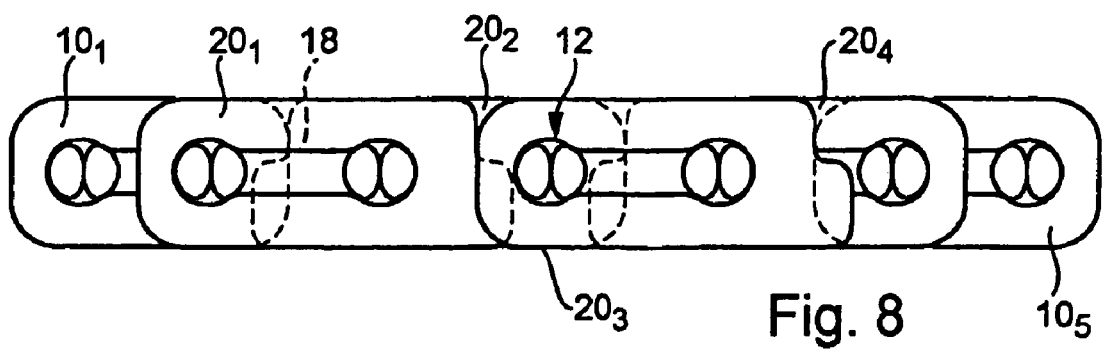

In the plate-link chain in accordance with FIG. 8, from left to right a long plate link $20_1$ with an extension arranged on the right side follows a short plate link $10_1$ followed by a long plate link $20_2$ with an extension arranged on the left side, again followed by a plate link $20_3$ with a rounded extension on the right side, which is followed by a plate link $20_4$ with an extension arranged on the left side, which is followed by a short plate link $10_5$. Thus, the plate-link chain in accordance with FIG. 8 is formed with four long spacings between short spacings.

From the foregoing it will be clear that in the connection described in accordance with FIGS. 7 and 8, both the number of short plate links 10 arranged between a pair of long plate links in the longitudinal direction of the plate-link chain, as well as the number of pairs of long plate links that follow one another, can vary so that plate-link chains can be manufactured whose acoustic excitation spectrum does not have any significant resonances.

The described plate-link chain can be changed in numerous ways, both in regard to the number of rows next to each other that are rounded, as well as concerns the form of the plate links. For example, the rocker member pairs 14 and 16 can be replaced by pins. In a triple connection identical plate links arranged next to one another can follow in the transverse direction of the plate-link chain. The extensions 22, designated as tips, can lengthen the plate links in terms of their total height, on one side or only in the middle region. As shown in FIG. 5, what is decisive is the lengthening by the extension 22 in the longitudinal direction of the plate-link chain such that the perpendicular web of a following plate link is overlapped.

What is claimed is:

1. A plate-link chain for belt-driven, conical pulley transmissions, said plate-link chain comprising: a plurality of plate links arranged one behind the other in several rows arranged next to one another transversely to a longitudinal direction of the plate-link chain and that overlap transversely to a chain running direction and that are connected by pins that penetrate the plate links transversely relative to the longitudinal direction, wherein each plate link is penetrated by two pins, one of which is supported on a forward inner side of a plate link opening in the longitudlnal direction of the plate-link chain and the other is supported on a rear inner side of plate link opening in the running direction of the plate-link chain, which plate links are drawn from one of two kinds of plate links that are assembled to form the chain, whereby plate links of one kind are longer in the longitudinal direction of the plate-link chain than are those of the other, shorter kind, the distance between the forward and the rear inner sides of the plate link openings of the longer plate links is greater than that of the openings of the shorter plate links, and the longer plate links each have an extension in the longitudinal direction at one of their longitudinal ends such that the extension overlaps an adjacent shorter plate link with which a longer plate link is connected in the longitudinal direction of the plate-link chain through an intermediate arrangement of an additional longer link, wherein pairs of side-by-side longer plate links have extensions that extend in opposite longitudinal directions.

2. A plate-link chain in accordance with claim 1, wherein the longer plate links follow one another in pairs in the longitudinal direction of the chain.

3. A plate-link chain in accordance with claim 2, wherein the longer plate links that follow one another in the longitudinal direction of the plate-link chain, have extensions that extend oppositely relative to the longitudinal direction of the plate-link chain.

4. A plate-link chain in accordance with claim 1, wherein an extension of one longer plate link of a pair of plate links in each case faces another longer plate link of the pair of plate links.

5. A plate-link chain in accordance with claim 1, wherein different numbers of shorter plate links and different numbers of pairs of plate links with longer plate links follow one another in the longitudinal direction of the plate-link chain.

6. A plate-link chain in accordance with claim 1, wherein the plate links are arranged in a triple plate link connection.

7. A plate-Link chain in accordance with claim 1, wherein pairs of side-by-side longer plate links have extensions that extend in the same longitudinal direction.

8. A plate-link chain for belt-driven, conical pulley transmissions, said plate-link chain comprising: a plurality of plate links arranged one behind the other in several rows arranged next to one another transversely to a longitudinal direction of the plate-link chain and that overlap transversely to a chain running direction and that are connected by pins that penetrate the plate links transversely relative to the longitudinal direction, wherein each plate link is penetrated by two pins, one of which is supported on a forward inner side of a plate link opening in the longitudinal direction of the plate-link chain and the other is supported on a rear inner side of a plate link opening in the running direction of the plate-link chain, which plate links are drawn from one of two kinds of plate links that are assembled to form the chain, whereby plate links of one kind are longer in the longitudinal direction of the plate-link chain than are those of the other, shorter kind, the distance between the forward and the rear inner sides of the plate link openings of the longer plate links is greater than that of the openings of the shader plate links, and the longer plate links each have an extension in the longitudinal direction at one of their longitudinal ends such that the extension overlaps an adjacent shorter plate link with which a longer plate link is connected in the longitudinal direction of the plate-link chain through an intermediate arrangement of an additional longer link, wherein pairs of side-by-side longer plate links have extensions that extend in the same longitudinal direction, and wherein adjacent pairs of side-by-side longer plate links have extensions that extend in opposite longitudinal directions.

9. A plate-link chain in accordance with claim 8, wherein the longer plate links follow one another in pairs in the longitudinal direction of the chain.

10. A plate-link chain in accordance with claim 9, wherein the longer plate links that follow one another in the longitudinal direction of the plate-link chain, have extensions that extend oppositely relative to the longitudinal direction of the plate-link chain.

11. A plate-link chain in accordance with claim 8, wherein an extension of one longer plate link of a pair of plate links in each case faces another longer plate link of the pair of plate links.

12. A plate-link chain in accordance with claim 8, wherein different numbers of shorter plate links and different numbers of pairs of plate links with longer plate links follow one another in the longitudinal direction of the plate-link chain.

13. A plate-link chain in accordance with claim 8, wherein the plate links are arranged in a triple plate link connection.

* * * * *